Figure 3:
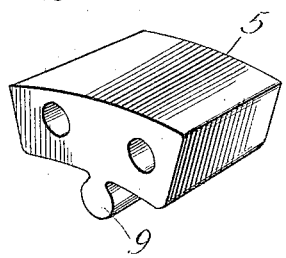

H. L. HUDSON.
GEAR.
APPLICATION FILED NOV. 30, 1914.
1,163,926.
Patented Dec. 14, 1915.
2 SHEETS—SHEET 1.
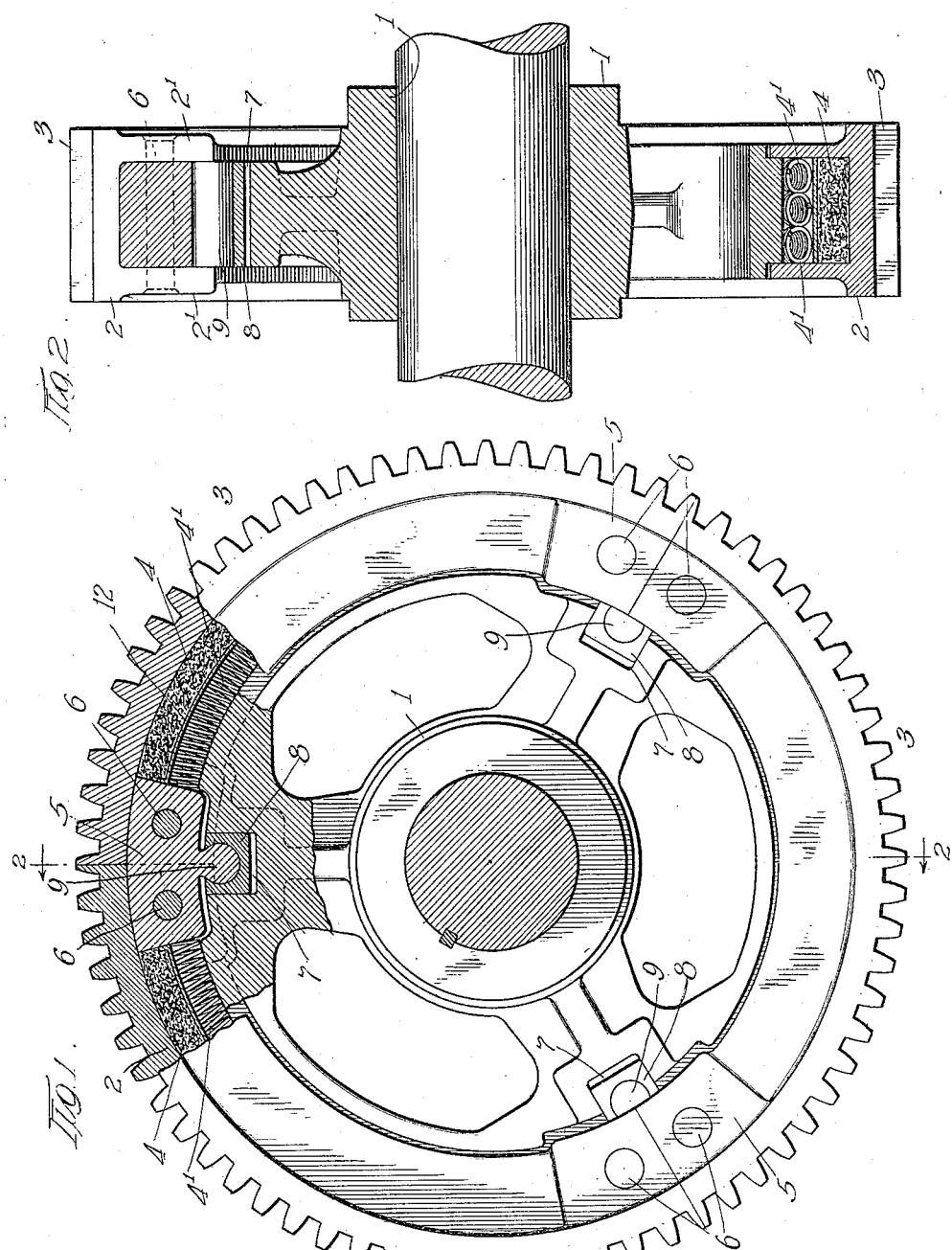
Witnesses:
Inventor:
Harrison L. Hudson.

H. L. HUDSON.
GEAR.
APPLICATION FILED NOV. 30, 1914.

1,163,926.

Patented Dec. 14, 1915.
2 SHEETS—SHEET 2.

Witnesses:
Arthur W. Carlson
Robert H. Weir

Inventor:
Harrison L. Hudson.
By G. L. Cragg Atty.

UNITED STATES PATENT OFFICE.

HARRISON L. HUDSON, OF CHICAGO, ILLINOIS.

GEAR.

1,163,926.  Specification of Letters Patent.  Patented Dec. 14, 1915.

Application filed November 30, 1914. Serial No. 874,324.

*To all whom it may concern:*

Be it known that I, HARRISON L. HUDSON, citizen of the United States, residing at Chicago, in the county of Cook and State of Illinois, have invented a certain new and useful Improvement in Gears, of which the following is a full, clear, concise, and exact description, reference being had to the accompanying drawings, forming a part of this specification.

My invention relates to power transmission gears, one feature of the invention having special relation to those gears in which the toothed portions are separated from but are movable with respect to the body portions and the invention is of particular service where sound insulating cushioning material is interposed between the toothed and body members of the gears to reduce or eliminate the noise due to gear operation.

A gear of this general class is disclosed by my United States Patent 1,043,012, dated October 29, 1912, wherein I have shown a plurality of guiding structures each made up of elements included in the formation of a toothed ring and body portion of a gear, whereby these two gear parts are interlocked or interengaged in such a manner as to prevent undesirable circumferential movement between these two gear parts. The toothed ring of the gear is flexible so that it may be forced out of its true shape when encountering unusual load, and is resilient so that it may automatically resume its true shape when the undue load is removed, the guiding means determining the direction in which the toothed ring may flex when subject to undue load and may return when resuming normal shape.

In practising my present invention I provide another form of mounting for the coupling blocks and another form of construction for the coupling lugs whereby they may not only serve their function as complements to the coupling blocks but may also be employed in carrying out another feature of my present invention wherein the toothed rings are formed in segments which the coupling lugs unite. While the coupling lugs are thus employed in realizing both features of my invention, yet I do not wish to be limited to the double function of these coupling lugs as the toothed ring of the gear may be formed in segmental sections that may be united by other bonds than the aforesaid double functioning coupling lugs.

I will explain my invention more fully by reference to the accompanying drawings showing the preferred embodiment thereof as it is embraced in an externally toothed spur gear, though it is to be understood that I do not limit myself to a spur gear, nor to a gear that is externally toothed.

Figure 4:
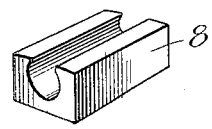
Figure 5:
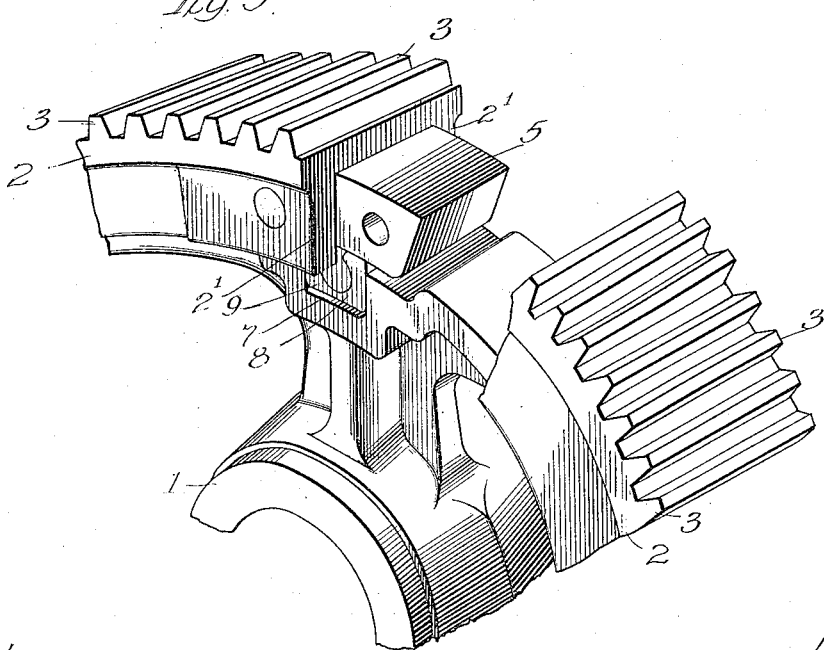

Figure 1 is a view in elevation, partially in section, of a gear constructed in accordance with the invention; Fig. 2 is a sectional view on line 2 2 of Fig. 1; Fig. 3 is a perspective view of a coupling lug; Fig. 4 is a perspective view of a coupling block; and Fig. 5 is a perspective view, with parts broken away, illustrating the invention.

Like parts are indicated by similar characters of reference throughout the different figures.

The body portion 1 of the gear is illustrated as being of skeleton construction and is surrounded by a ring 2 which is provided with gear teeth 3 upon its outer periphery. The ring 2 is flexible so that it may be forced out of its true circular shape and is resilient so that it may automatically resume its proper shape. A composite cushion is interposed between the body 1 and the ring 2, this composite cushion including a sound deadening element 4 which is backed by springs $4^1$ (which may be variously formed and arranged) that are depressed by the sound deadening material whereby the springs due to their own resilience, will press the sound deadening material, preferably made of felt, outwardly to maintain it in constant engagement with the inner surface of the ring 2. The springs will follow the sound deadening material 4 as this material contracts so that no space will intervene between the ring 2 and the sound deadening material 4. The two elements 4, $4^1$ of the composite cushion thus coöperate to constitute a sound deadening or insulating element and are together sufficiently resilient to fill the changeable clearance between the gear elements 1 and 2. The cushion will yield to permit the toothed ring to move with respect to the axis of rotation of the body member 1 and transversely of such axis, the clearance between the members 1 and 2 of the gear being preferably just sufficient to permit the gear teeth of another gear that mesh with the gear teeth 3 to have their outer edges reach the pitch circle of the gear teeth 3, by which arrangement the gears will not become unmeshed although the toothed ring 2 is permitted to move away from the gear with which it is in mesh, when the teeth 3 encounter unusual opposition.

In order to prevent undesirable relative circumferential movement of the members 1 and 2, I provide a plurality of insetting coupling lugs 5 that are secured between the insetting flanges $2^1$ upon the ring 2 by means of riveting pins 6. These lugs are bottomed upon the inner cylindrical base of the ring 2 on which account the elements 4, $4^1$ of the composite cushion are divided into sections or sets that intervene between adjacent lugs 5. The body member of the gear is provided with radially alined channels 7 located transversely of the gear plane. There are desirably three such lug channels equidistant around the gear. Each channel or recess 7 receives a radially disposed or alined coupling block 8 that is in free sliding fit with the channel side walls which thus coöperate with the engaging blocks 8 to prevent undesirable circumferential movement relatively between the members 1 and 2 of the gear, there being clearance between the inner faces of the blocks 8 and the bottoms of the channels 7 to permit of required flexure of the ring 2 as the lugs become interposed between the place of unusual pressure upon the teeth 3 and the shaft 11 upon which the body portion of the gear is keyed. The toothed ring being sufficiently flexible, the portion thereof that is immediately subject to unusual pressure or load is moved toward the body of the gear without accompanying undesirable circumferential motion owing to the guide structure which I have provided. When the unusual load has been removed the ring will automatically resume its proper shape due to its resiliency. The three coupling blocks are flexibly secured to the coupling lugs by means of holding tongues 9 integrally formed with the lugs and extending transversely of the gear plane, these tongues being somewhat in the nature of cylindrical shafts which are received within correspondingly shaped recesses in the blocks 8 which are thus adapted to turn slightly upon the tongues 9 whereby the blocks 8 may be adapted to their containing channels 7 without depending upon refined accuracy of construction of the lugs. Endwise movement of the coupling lugs 5 and the coupling blocks 8 is prevented owing to the engagement of the end faces thereof with the insetting flanges $2^1$.

When the composite cushion composed of the elements 4, $4^1$ is compressed consequent upon relative movement between the ring and body members of the gear, the coupling lugs 5 will move radially of the gear. Backing plates 12 may be interposed between the sound deadening material 4 and the springs $4^1$ to protect the sound deadening material against the wear of the springs thereupon when the parts are relatively moved.

I will now fully describe that feature of my invention which is not to be limited to the type of gear covered by my aforesaid patent and which feature embraces the subdivision of the toothed ring inclusive of the flanges $2^1$ thereof into a plurality of bonded segments, the couplers which are relied upon to bond the segments being the insetting lugs 5 that are positioned to bridge the plane defining the locality of the engagement of the adjacent butt faces of adjacent segments of the ring. The riveting pins 6 are located equal distances upon opposite sides of this plane and the metal of each coupling lug 5 is equally distributed upon both sides of such plane whereby the segments of the ring are firmly bound together. When the gear is to be taken apart the pins 6 are reduced at their ends and thereafter removed whereupon the segments of the toothed ring may be separated from the balance of the structure. Not only is this construction of advantage in disassembling the parts of the gear but it is also of advantage in the initial manufacture of the gear and replacement of its parts.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

1. A gear including spaced apart toothed and body members; and a guide structure having complemental portions that are provided upon said members, and which guide structure serves to define relative movement between said members transversely of the axis of rotation, the toothed member of the gear being of ring like formation and sufficiently flexible to permit it to be moved with respect to the body member of the gear at the part where unusual load is encountered and being sufficiently resilient to permit it to resume its proper shape when the undue load is removed, the aforesaid guide structure portions being in the form of insetting coupling lugs having tongues upon their inner ends extending transversely of the plane of the gear and coupling blocks movably connected with the lugs by said tongues and in sliding fit with channels provided in the body member of the gear, sufficient clearance intervening between the bottoms of the channels and the innermost faces of said blocks to permit of the flexible movement of the ring member of the gear and the accompanying movement of the coupling lugs and blocks carried thereby.

2. A gear including spaced apart toothed and body members; and a guide structure having complemental portions that are provided upon said members, and which guide structure serves to define relative movement between said members transversely of the axis of rotation, the toothed member of the gear being of ring like formation and sufficiently flexible to permit it to be moved with respect to the body member of the gear at the part where unusual load is encountered and being sufficiently resilient to permit it to resume its proper shape when the undue load is removed, the aforesaid guide structure portions being in the form of insetting coupling lugs carried by the ring member of the gear and coupling blocks movably connected with the inner ends of the lugs, these blocks being in sliding fit with channels provided in the body member of the gear, sufficient clearance intervening between the bottoms of the channels and the innermost faces of said blocks to permit of the flexible movement of the ring member of the gear and the accompanying movement of the coupling lugs and blocks carried thereby.

3. A gear including spaced apart toothed and body members; and a guide structure having complemental portions that are provided upon said members, and which guide structure serves to define relative movement between said members transversely of the axis of rotation, the toothed member of the gear being of ring like formation and sufficiently flexible to permit it to be moved with respect to the body member of the gear at the part where unusual load is encountered and being sufficiently resilient to permit it to resume its proper shape when the undue load is removed, the aforesaid guide structure portions being in the form of coupling lugs having tongues extending transversely of the plane of the gear and coupling blocks movably connected with the lugs by said tongues and in sliding fit with channels provided in the member of the gear companion to that carrying the lugs, sufficient clearance intervening between the bottoms of the channels and the adjacent faces of said blocks to permit of the flexible movement of the ring member of the gear.

4. A gear including spaced apart toothed and body members; and a guide structure having complemental portions that are provided upon said members, and which guide structure serves to define relative movement between said members transversely of the axis of rotation, the toothed member of the gear being of ring like formation and sufficiently flexible to permit it to be moved with respect to the body member of the gear at the part where unusual load is encountered and being sufficiently resilient to permit it to resume its proper shape when the undue load is removed, the aforesaid guide structure portions being in the form of coupling lugs carried by one of the gear members and coupling blocks movably connected with the lugs, these blocks being in sliding fit with the gear member complemental to the one which carries the lugs, sufficient clearance intervening between the bottoms of the channels and the adjacent faces of said blocks to permit of the flexible movement of the ring member of the gear.

5. A gear including spaced apart toothed and body members; and a guide structure having complemental portions that are provided upon said members, and which guide structure serves to define relative movement between said members transversely of the axis of rotation, the guide structure portions being in the form of coupling lugs carried by one of the gear members and coupling blocks movably connected with the lugs, these blocks being in sliding fit with the gear member complemental to the one which carries the lugs.

6. A gear including spaced apart toothed and body members; and a guide structure having complemental portions that are provided upon said members, and which guide structure serves to define relative movement between said members transversely of the axis of rotation, the guide structure portions being in the form of coupling lugs carried by one of the gear members and coupling blocks in tongue and groove connection with the lugs, these blocks being in sliding fit with the gear member complemental to the one which carries the lugs.

In witness whereof, I hereunto subscribe my name this nineteenth day of November A. D., 1914.

HARRISON L. HUDSON.

Witness:

ETTA L. WHITE.

Copies of this patent may be obtained for five cents each, by addressing the "Commissioner of Patents, Washington, D. C."